United States Patent Office 3,262,975
Patented July 26, 1966

3,262,975
1-CHLORO-3,4-DIHYDRO 2-NAPHTHALDEHYDE
OXIME AND ETHERS THEREOF
Leo A. Paquette, Portage Township, Kalamazoo County, Mich., assignor to The Upjohn Company, Kalamazoo, Mich., a corporation of Delaware
No Drawing. Original application Feb. 12, 1963, Ser. No. 257,876. Divided and this application Aug. 7, 1963, Ser. No. 300,661
3 Claims. (Cl. 260—566)

This application is a division of application Serial No. 257,876, filed February 12, 1963, and now abandoned.

This invention relates to novel compositions of matter and the method of preparing the same. It is particularly directed to novel oximes and oxime ethers of cyclic halovinyl aldehydes, derivatives thereof, and processes for the preparation of the same.

The novel compounds of the invention have the following formula:

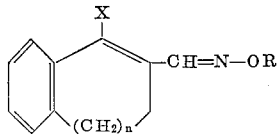

(I)

wherein R is selected from the group consisting of hydrogen, loweralkyl, and loweralkenyl, X is selected from the group consisting of chlorine and bromine, and $n$ is an integer from 1 to 2. Examples of loweralkyl are methyl, ethyl, propyl, butyl, pentyl, hexyl, heptyl, and octyl and the isomeric forms thereof. Examples of loweralkenyl are allyl, 1-methylallyl, 2-methylallyl (methallyl), 2-butenyl (crotyl), 3-butenyl, 1,2,-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 1,4-dimethyl-4-hexenyl, and the like.

The novel oximes and oxime ethers of the invention (Formula I) are prepared by reacting a cyclic halovinyl aldehyde having the following formula:

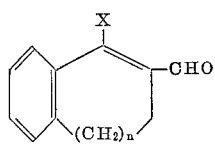

(II)

with an hydroxylamine having the formula H₂N—OR wherein R is as given above.

Advantageously, the reaction between the cyclic halovinyl aldehyde of Formula II and the hydroxylamine of formula H₂N—OR is carried out in the presence of an inert solvent, e.g., methanol, ethanol, propanol, and butanol, and mixtures of water and these lower alkanols. The hydroxyamine can be incorporated into the reaction mixture per se or as an acid addition salt, e.g., as a hydrochloride or sulfate, in which case an alkaline material such as sodium or potassium acetate is added to the mixture in order to release the free base. Stoichiometrically the reaction requires equimolar amounts of the aldehyde and the hydroxylamine, although an excess of either reactant can be employed if so desired. Preferably, the aldehyde and the hydroxylamine are employed in molar ratios varying from about 1:1.5 to 1.5:1. The reaction can be carried out over a wide range of temperature preferably between about 0° C. and about 125° C., and more particularly between about 20° C. and about 100° C. In many instances, it is very convenient to carry out the reaction at the reflux temperature of the inert solvent. The time required for completing the reaction will of course depend on the temperature at which the reaction is conducted and the reactivity of the particular reactants; generally speaking, reaction times varying from about 1 hour to about 6 hours suffice. Upon completion of the reaction, the desired oxime or oxime ether of Formula I can be isolated and purified by conventional procedures, e.g., filtration of the reaction mixture followed by recrystallization of the product thus obtained, or solvent extraction of the reaction mixture followed by evaporation of the extract and distillation of the residue.

The cyclic halovinyl aldehydes of Formula II can be prepared by reacting 3,4-dihydro-1(2H)naphthalenone (α-tetralone) or 6,7,8,9-tetrahydro-5H-cycloheptabenzen-5-one (benzsuberone) with a formylating agent consisting of dimethylformamide and a phosphorus halide such as phosphorus oxychloride or phosphorus oxybromide. See Ziegenbein et al., Chem. Ber. 93, 2743, 1960. The O-alkyl and O-alkenylhydroxylamines (compounds of formula H₂N—OR in which R is loweralkyl or loweralkenyl as given above) can be prepared by reacting hydroxyurethane (HO—NH—COOC₂H₅) with the appropriate alkyl or alkenyl halide, followed by hydrolysis of the resulting product with aqueous alkali metal hydroxide. See Cope et al., J. Am. Chem. Soc. 71, 3427, 1949.

The novel compounds of the invention (Formula I) have central nervous system depressant activity and anti-inflammatory activity and can be used for effecting sedation in and for allaying inflammation in mammals, birds, and other animals. They also have antibacterial and antifungal activity, for example, against *Staphylococcus aureus*, *Bacillus subtilis*, *Staphylococcus albus*, *Klebsiella pneumoniae*, and *Trichophyton rubrum*, and can be used for decontamination of surfaces contaminated with such bacteria and fungi.

The novel oximes of Formula I in which R is hydrogen are also useful as intermediates. On reduction with lithium aluminum hydride they are converted to novel primary amines having the formula:

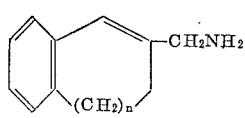

(III)

wherein $n$ is as given above. The reduction is carried out in the presence of an inert solvent, illustratively an ether such as tetrahydrofuran (preferred), diethyl ether, dibutyl ether, and the like. Molar ratios of the oxime to lithium aluminum hydride ranging from about 1:0.75 to about 1:2 can be employed. Ordinarily, however, it is preferred to employ substantially equimolar amounts of the reactants. The reaction can be carried out at temperatures ranging from about 0° C. to about 150° C., preferably from about 20° C. to about 100° C. The time required for completing the reaction will of course depend on the reaction temperature and the reactivity of the particular oxime being reduced; generally speaking, reaction times varying from about 1 hour to about 6 hours suffice. Upon completion of the reaction, the reaction mixture is decomposed, e.g., with water and 25% aqueous sodium hydroxide solution, and the liquid phase is separated from the solid phase. The amine of Formula III can then be isolated, e.g., by evaporation of the liquid phase, and purified, e.g., by distillation or conversion to an acid addition salt.

The novel amines of Formula III are nitrogenous bases and as such can exist in both the protonated and nonprotonated form according to the pH of the environment. The protonated forms can be isolated as acid addition salts which are useful in upgrading the free base, that is, the nonprotonated form. Suitable acids for this purpose include hydrochloric acid, sulfuric acid, phosphoric acid, acetic acid, succinic acid, salicylic acid, maleic acid, thiocyanic acid, fluosilicic acid, picric acid, Reinecke's acid, azobenzenesulfonic acid, and the like. The acid addition salts can be formed by neutralizing the free base with the appropriate acid or by metathesis. The novel compounds of Formula III are also useful as intermediates. Thus, the condensation products obtained from the thiocyanic acid addition salts and formaldehyde according to U.S. Patents 2,425,320 and 2,606,155 are useful as pickling inhibitors. The fluosilicic acid addition salts are useful as moth-proofing agents according to U.S. Patents 1,915,334 and 2,075,359. They are also useful in forming amine salts of penicillin of low solubility.

The invention may be more fully understood by reference to the following illustrative examples in which the parts and percentages are by weight unless otherwise specified.

*Example 1.—1-chloro-3,4-dihydro-2-naphthaldehyde oxime*

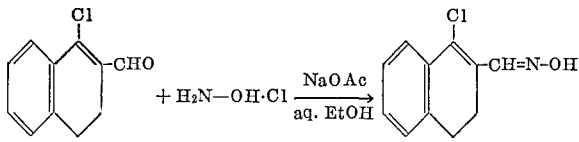

A mixture of 19.1 g. (0.10 mole) of 1-chloro-3,4-dihydro-2-naphthaldehyde, 9.05 g. (0.13 mole) of hydroxylamine hydrochloride, 12.3 g. (0.15 mole) of anhydrous sodium acetate, and 150 ml. of 90% aqueous ethanol was refluxed with stirring for 3 hrs. Water (150 ml.) was added and the mixture was cooled. The crystalline oxime was filtered and dried. There was obtained 19.5 g. of yellow solid, M.P. 121–125° C. Three recrystallizations of this material from aqueous ethanol gave pure 1 - chloro - 3,4 - dihydro-2-naphthaldehyde oxime as buff needles, M.P. 126–127° C.

Analysis.—Calcd. for $C_{11}H_{10}ClNO$: C, 63.62; H, 4.85; N, 6.75. Found: C, 63.58; H, 4.82; N, 6.86.

*Example 2.—9-chloro-6,7-dihydro-5H-benzocycloheptene-8-carboxaldehyde oxime*

Following the procedure of Example 1, substituting the 1-chloro-3,4-dihydro-2-naphthaldehyde by 9-chloro-6,7-dihydro - 5H - benzocycloheptene-8-carboxaldehyde, there was obtained 9-chloro-6,7-dihydro-5H-benzocycloheptene-8-carboxaldehyde oxime.

*Example 3.—1-chloro-3,4-dihydro-2-naphthaldehyde O-propyloxime*

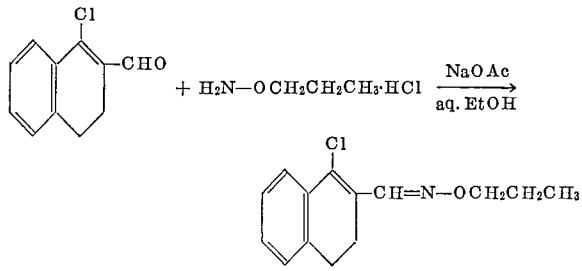

A mixture of 8.6 g. (0.045 mole) of 1-chloro-3,4-dihydro-2-naphthaldehyde, 5.0 g. (0.045 mole) of O-propylhydroxylamine hydrochloride, 5.3 g. (0.065 mole) of anhydrous sodium acetate, and 75 ml. of 90% aqueous ethanol was refluxed with stirring for 3 hrs. Water (200 ml.) was added and the oil which separated was extracted with methylene chloride. The combined organic layers were dried, filtered and evaporated. The oily residue was distilled in vacuo to give 10.1 g. of yellow liquid; B.P. 130–135° C. (0.30 mm.); $n_D^{26}=1.6043$. Redistillation of this material gave pure 1-chloro-3,4-dihydro-2-naphthaldehyde O-propyloxime as a pale yellow oil; B.P. 137–138° C. (0.25 mm.); $n_D^{24}=1.6050$.

Analysis.—Calcd. for $C_{14}H_{16}ClNO$: C, 67.33; H, 6.46; N, 5.61. Found: C, 67.66; H, 6.45; N, 5.23.

*Example 4.—9-chloro-6,7-dihydro-5H-benzocycloheptene-8-carboxaldehyde O-propyloxime*

Following the procedure of Example 3, substituting the 1 - chloro-3,4-dihydro-2-naphthaldehyde by 9-chloro-6,7-dihydro - 5H - benzocycloheptene-8-carboxaldehyde, there was obtained 9-chloro-6,7-dihydro-5H-benzocycloheptene-8-carboxaldehyde O-propyloxime.

Following the procedure of Examples 3 and 4, substituting the O-propylhydroxylamine hydrochloride by O-loweralkylhydroxylamine hydrochlorides and O - loweralkenylhydroxylamine hydrochlorides wherein the lower alkyl groups and the loweralkenyl groups are those enumerated above, there are obtained the corresponding O-loweralkyloximes and O-loweralkenyloximes of 1-chloro-3,4-dihydro-2-naphthaldehyde and 9-choloro-6,7-dihydro-5H-benzcycloheptene-8-carboxaldehyde.

*Example 5.—3,4dihydro-2-naphthalenemethylamine and hydrochloride thereof*

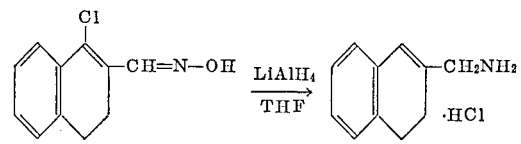

A. To a stirred slurry of 1.9 g. (0.050 mole) of lithium aluminum hydride in 50 ml. of tetrahydrofuran was added dropwise with stirring a solution of 10.3 g. (0.050 mole) of the oxime of Example 1 in 50 ml. of tetrahydrofuran. After completion of the addition, the mixture was stirred at about 25° C. for 3 hours and then refluxed for 0.5 hr. After cooling, the reaction mixture was decomposed by the addition of 2 ml. of water, 2 ml. of 25% aqueous sodium hydroxide solution, and 6 ml. of water in that order. The precipitated solids were removed by filtration and the filtrate was evaporated. The residual oil was distilled to give 2.45 g. of 3,4-dihydro-2-naphthalenemethylamine as a pale yellow liquid, B.P. 88–99° C. (0.4 mm.).

B. The free base of Part A was converted to its hydrochloride with ethereal hydrogen chloride. Three recrystallizations of the salt from ethanol-ether gave pure 3,4 - dihydro - 2 - naphthalenemethylamine hydrochloride, M.P. 258.5–260° C.

Analysis.—Calcd. for $C_{11}H_{14}ClN$: C, 67.51; H, 7.21; Cl, 18.12. Found: C, 67.25; H, 7.30; Cl, 18.15.

*Example 6*

By substituting the 1-chloro-3,4-dihydronaphthaldehyde oxime used in Example 5 by the 9-chloro-6,7-dihydro-5H-benzocycloheptene-8-carboxaldehyde oxime of Example 2, there was obtained 6,7-dihydro-5H-benzocycloheptene-8-methylamine as the free base and as the hydrochloride.

By substituting 1-bromo-3,4-dihydro-2-naphthaldehyde and 9 - bromo - 6,7-dihydro-5H-benzocycloheptene-8-carboxaldehyde in Examples 1 through 4, the corresponding 1-bromo-3,4-dihydro-2-naphthaldehyde and 9-bromo-6,7- dihydro-5H-benzocycloheptene-8-carboxaldehyde oximes, and O-loweralkenyloximes are obtained.

I claim:
1. Compounds having the formula:

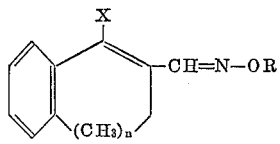 (I)

wherein X is selected from the group consisting of chlorine and bromine, R is selected from the group consisting of hydrogen, loweralkyl, and loweralkenyl, and $n$ is an integer from 1 to 2.

2. 1-chloro-3,4-dihydro-2-naphthaldehyde oxime.
3. 1 - chloro - 3,4-dihydro-2-naphthaldehyde O-propyloxime.

References Cited by the Examiner

Elsevier: "Encyclopedia of Organic Chemistry," volume 12B, page 2306 (1950).

CHARLES B. PARKER, *Primary Examiner.*

FLOYD D. HIGEL, *Assistant Examiner.*